June 20, 1933.  F. E. SCHWENTLER  1,914,620
TRUCK BRAKE RIGGING
Filed July 10, 1931  2 Sheets-Sheet 1
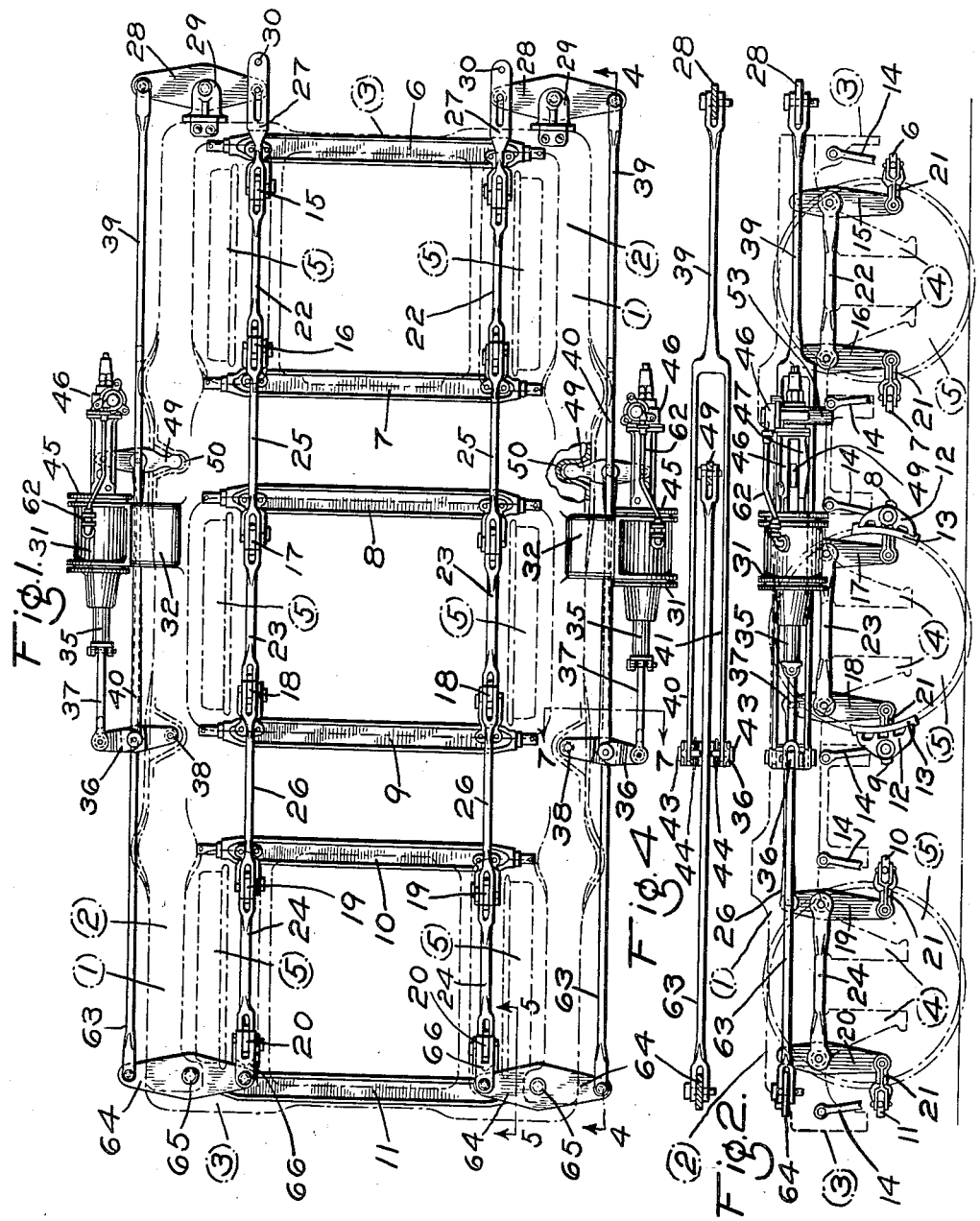
INVENTOR.
FRANCIS E. SCHWENTLER
By  *Wm. H. Cady*
ATTORNEY.

June 20, 1933.  F. E. SCHWENTLER  1,914,620
TRUCK BRAKE RIGGING
Filed July 10, 1931   2 Sheets-Sheet 2
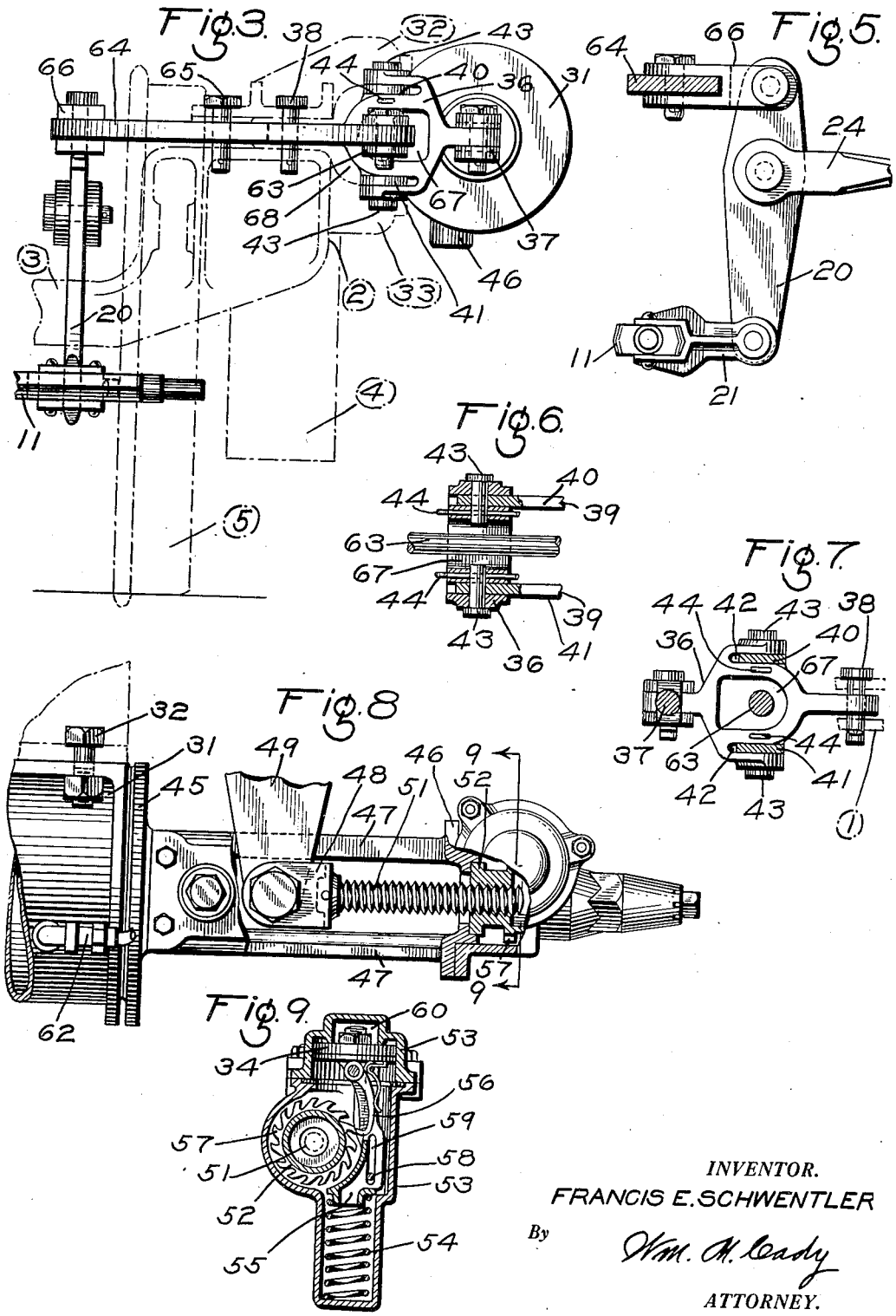
INVENTOR.
FRANCIS E. SCHWENTLER
By  Wm. M. Cady
ATTORNEY.

Patented June 20, 1933

1,914,620

UNITED STATES PATENT OFFICE

FRANCIS E. SCHWENTLER, OF ST. LOUIS, MISSOURI, ASSIGNOR TO THE AMERICAN BRAKE COMPANY, OF ST. LOUIS, MISSOURI, A CORPORATION OF MISSOURI

TRUCK BRAKE RIGGING

Application filed July 10, 1931. Serial No. 549,820.

This invention relates to brake equipment for railway car trucks and more particularly to that type of equipment in which the brake shoes are adapted to be moved into and out of braking engagement with the car wheels through the medium of a system of operatively connected levers and rods which are adapted to be operated by means of a brake cylinder carried by the truck frame and in which a slack adjuster for taking up slack, which may develop in the equipment, is also carried by the truck frame.

The principal object of my invention is to provide an improved truck brake equipment of the above type.

Another object of the invention is to provide a truck brake equipment having the brake cylinder, slack adjuster and connections therefrom to the brake shoes so disposed that no part thereof extends above the highest part of the truck frame, thus greatly improving clearance conditions between the truck frame and that portion of a car body supported thereby.

Another object is to provide an improved truck brake equipment in which a brake cylinder with an automatic slack adjuster preferably attached thereto is secured directly to a side member of the truck frame at or adjacent the transverse center line of the truck frame where the flexing action of the fluid conducting connection between the car body and the brake cylinder is the least when, as in rounding a curve, relative movement between the car body and truck occurs. Another advantage of so positioning the brake cylinder and slack adjuster is that they do not increase the over-all length of the truck and therefore greatly improve clearance conditions between the end of the truck frame and adjacent parts of the car body.

It has heretofore been proposed to secure the brake cylinder and slack adjuster to one of the extreme ends of the truck frame, but in this position they would increase the over-all length of the truck and also be subject to the severe service vibrations of the end of the truck frame, which might cause excessive wear of the movable parts of the slack adjuster and brake cylinder. By positioning the brake cylinder and slack adjuster near the transverse center line of the truck frame, they will be free from service vibrations of such magnitude as to cause excessive wear of their several movable parts and will not increase the over-all length of the truck.

A still further object is to provide a compact truck brake equipment in which the brake cylinder, slack adjuster and connections therefrom to the remainder of the equipment are readily accessible for adjustment, inspection and repair or replacement.

Other objects and advantages will appear in the following more detailed description of the invention.

In the accompanying drawings; Fig. 1 is a plan view of a truck brake equipment embodying my invention, the usual brake heads and shoes being omitted; Fig. 2 is a side elevational view of the same, the brake heads and shoes for one wheel being shown; Fig. 3 is an enlarged end elevational view of a portion of the brake equipment; Fig. 4 is a sectional view taken substantially along the line 4—4 of Fig. 1; Fig. 5 is an enlarged sectional view taken along the line 5—5 of Fig. 1; Fig. 6 is an enlarged fragmentary sectional view taken along the line 4—4 of Fig. 1; Fig. 7 is an enlarged sectional view taken along the line 7—7 of Fig. 1; Fig. 8 is an enlarged fragmentary plan view, partly in section, of a brake cylinder and an automatic slack adjuster; and Fig. 9 is a vertical sectional view taken along the line 9—9 of Fig. 8. In Figs. 1, 2, 3 and 8, portions of the truck frame are shown in dot and dash lines.

In the drawings, my improved truck brake equipment is shown, for illustrative purposes only, as being of the clasp type and is further illustrated as being applied to a six wheel truck having a truck frame 1.

The truck frame 1 may be of any desired construction and as shown, is of the usual cast metal type having longitudinally extending parallel side members 2 which are integrally connected by end members 3. Depending downwardly from the side members 2 and integral therewith are pairs of pedestals 4, each pair serving as guides for the usual journalling means (not shown) for the wheels 5.

The brake equipment may comprise brake beams 6, 7, 8, 9, 10 and 11 which are arranged one on either side of each pair of wheels and are each provided at each end with a brake head 12 having a brake shoe 13 secured thereto adapted to engage with the tread of one of the wheels 5. Only one pair of brake heads and shoes for one wheel is shown in the drawings, but it will be understood that there will be a pair of such brake heads and shoes for each wheel. The brake beams are pivotally supported from the truck frame 1 by hangers 14.

In the present embodiment of the invention, two sets of my improved equipment is employed, one set being arranged at each side of the truck and operatively connected to the brake beams. Both sets being substantially alike, only one set will now be described in detail.

The equipment at either side of the truck comprises live levers 15, 16, 17, 18 and 19 and a dead lever 20, all of which are preferably disposed vertically and, at their lower ends are pivotally connected to the respective brake beams 6, 7, 8, 9, 10 and 11 through the medium of clevis connections 21.

The live levers 15 and 16 are operatively connected together intermediate their ends by a rod 22, and the live levers 17 and 18 are in a like manner connected by a rod 23. The live lever 19 and dead lever 20 are operatively connected together, intermediate their ends, by a rod 24. The live levers 16 and 17 are operatively connected together at their upper ends by a rod 25 and the upper ends of the live levers 18 and 19 are connected in the same manner by a rod 26. These brake levers and rods may be supported upon the truck frame in the usual well known manner.

The upper end of the live lever 15 is operatively connected, through the medium of a rod 27, to the inner end of a horizontally disposed lever 28, which is pivotally connected, intermediate its ends, to a bracket 29 secured to the end member 3 of the truck frame. An opening 30 is formed in the outer end portion of the rod 27 for the attachment of a hand brake connection (not shown). The connection between the rod 27 and the inner end of the lever 28 is such that when the brakes are being manually operated, the rod 27 is permitted to move longitudinally relative to the lever 28.

Adjacent the transverse center line of the truck, a brake cylinder 31 is secured to brackets 32 and 33 cast integral with the side member 3 of the truck frame. It will here be understood that, if desired, the brake cylinder may be cast integral with the truck frame.

Contained in the brake cylinder 31 is the usual piston (not shown) having a stem 35 which is operatively connected to the outer end of a cylinder lever 36 by a rod 37, the inner end of said lever being pivotally connected to the truck frame by a pin 38. Intermediate its ends the cylinder lever is operatively connected to the forked end of a pull rod 39, the other end of the rod being operatively connected to the outer end of the lever 28.

The forked end of the pull rod 39 comprises tines 40 and 41 which are spaced apart vertically. The end portion of each tine is received in a slot 42 formed in the cylinder lever and is pivotally secured to the lever by a pin 43 which is held in place by a cotter pin 44 passing through openings in the lever and pin 43. Within the slots 42 the lever is adapted to engage the top and bottom surfaces of the tines 40 and 41 so as to maintain the ends of the tines in their proper positions relative to each other.

Secured to or integral with the pressure head 45 of the brake cylinder 31 and extending outwardly therefrom in the direction of the length of the cylinder is a slack adjuster casing 46 comprising spaced members 47 which form guides for an adjustable fulcrum block 48 to which the outer end of a fulcrum lever 49 is pivotally connected, the inner end portion of the lever pivotally engaging the truck frame within a recess 50 formed in the frame. For adjusting the position of the fulcrum block 48, an adjusting screw 51 is provided which passes through a rotatable screw-threaded ratchet adjusting nut 52, the screw threads of the nut operatively engaging the screw threads of the adjusting screw 51. It will here be noted that the inner end portion of the lever 49 is loosely mounted in the truck frame so that the lever is free to move in the direction of its length either inwardly or outwardly relative to the truck frame to compensate for the angularity of the lever as its position is being varied by the action of the slack adjuster.

The slack adjuster casing also comprises a vertically disposed cylinder 53 which, at one side of the adjusting nut 52, contains a piston 34 and which at the other side of said nut contains a coil spring 54 which engages the lower end of a stem 55 of the piston 34.

Pivotally connected to the piston stem 55 is a pawl 56 adapted to engage ratchet teeth 57 on the adjusting nut 52.

The piston 34 and pawl 56 are guided and maintained in their proper operating positions by means of a bolt 58, secured in the casing and extending through an elongated slot 59 formed in the piston stem 55.

The piston chamber 60 at one side of the piston 34 is normally connected to the non-pressure chamber of the brake cylinder through a pipe 62.

The horizontally disposed fulcrum lever 49, intermediate its ends, has one end of a fulcrum rod 63 pivotally connected thereto, the opposite end of said rod being operatively connected to the outer end of another horizontally disposed fulcrum lever 64 arranged at one end of the truck frame adjacent the dead lever 20. This lever 64, intermediate its ends is pivotally connected to the truck frame by a pin 65. The inner end of the lever 64 is operatively connected to the upper end of the dead lever 20 through the medium of a clevis connection 66.

It will be noted that the fulcrum lever 49 passes between the tines 40 and 41 of the pull rod 39 and that the fulcrum rod 63 is disposed between said tines and passes through an opening 67 formed in the lever 36. The forked end of the pull rod and the fulcrum rod 63 pass between the side member of the truck frame and the side of the brake cylinder 31, there being an opening 68 defined by the lugs 32 and 33 and the brake cylinder 31 to accommodate these rods. All of the above contributes to a very compact and accessible arrangement of the levers and rods at the side of the truck frame and obviates the necessity of offsetting the several rods and levers.

The several parts of my truck brake equipment have been so arranged that no part thereof extends above the horizontal plane of the highest portions of the truck frame, this being done to improve clearance conditions between the truck frame and the body of a car.

In operation, when fluid under pressure is supplied to the brake cylinders 31, the pistons therein move to force the piston rods 37 outwardly, operating the system of levers connected therewith and connected with the adjusting blocks 48 of the slack adjusters to apply the brake shoes to the treads of the wheels 5.

Upon thus applying the brakes, if the movement of the brake cylinder piston of a brake cylinder exceeds the normal amount, due to wear of the brake shoes and slack in the other parts of the equipment, the piston will uncover a brake cylinder port which is open to the pipe 62, so that fluid under pressure will be supplied from the pressure side of the brake cylinder piston, through pipe 62, to the piston chamber 60 in the slack adjuster and the piston 34 will be operated to shift the pawl 56 to engage a tooth 57 of the adjusting nut 52.

When the brakes are released, fluid under pressure is released from the piston chamber 60, and the spring 54, which has been compressed, acts to retract the piston 34, so that the pawl 56 actuates the adjusting nut 52 to draw up the adjusting screw 51 and block 48, thereby operating the dead lever 20 to take up slack in the equipment.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a truck brake equipment, the combination with a truck frame having spaced side members, of operatively connected live and dead levers carried by said truck frame between said side members, a brake cylinder device and a slack adjuster device arranged on the outside of and secured to one of said side members, means operatively connecting the brake cylinder device to a live lever at one end of the truck frame, and means operatively connecting the dead lever at the opposite end of the truck to said slack adjusting device.

2. In a truck brake equipment, the combination with a truck frame having side members, of operatively connected live and dead levers carried by said truck frame, a brake cylinder device and a slack adjusting device secured to one of said side members adjacent the transverse center line of said truck frame, means operatively connecting the brake cylinder to a live lever at one end of the truck frame, and means operatively connecting the dead lever at the opposite end of the truck frame to said slack adjusting device.

3. In a truck brake equipment, the combination with a truck frame, of a dead lever and a plurality of live levers operatively connected together and carried by said truck frame, an auxiliary lever operatively connected to one of said live levers, a pull rod for operating said auxiliary lever, a brake cylinder device carried by said frame, a brake cylinder lever connected to said pull rod and operated by said brake cylinder for operating said auxiliary lever and thereby said dead and live levers, a slack adjuster carried by said truck frame, a fulcrum lever connected to said dead lever, another fulcrum lever interposed between and operatively connected to the truck frame and slack adjuster, and a rod operatively connecting said fulcrum levers.

4. In a truck brake equipment, the combination with a truck frame having side members, of a system of operatively connected brake levers carried by said truck frame and arranged between said side members, said system comprising a vertically disposed dead lever, and an adjustable fulcrum for said dead lever arranged on the outside of and carried by one of said members.

5. In a truck brake equipment, the combination with a truck frame having side members, of a system of operatively connected brake levers carried by said truck frame and arranged between said side members, said system comprising a dead lever, and an automatically operated slack adjuster carried by one of said side members and operatively connected to said dead lever, said slack adjuster being arranged on the outside of said side member.

6. In a truck brake equipment, the combination with a truck frame having side members, of a system of operatively connected brake levers carried by said truck frame and arranged between said side member, said systems comprising a dead lever, and slack adjusting means carried by one of said side members operable automatically for varying the position of said dead lever to take up slack in said equipment, said slack adjusting means being arranged on the outside of the last mentioned side member.

7. In a truck brake equipment, the combination with a truck frame having side members, of a system of operatively connected brake levers carried by said truck frame, said system comprising a dead lever and a live lever and also comprising means for operating said live lever, of a fulcrum lever operatively connected to said dead lever, a slack adjuster carried by one of said side members, another fulcrum lever pivotally connected to the truck frame and slack adjuster, and means operatively connecting said fulcrum levers.

8. In a brake equipment for a truck having spaced side frames and a plurality of pairs of wheels, the combination with brake shoes applied to both sides of each pair of wheels, of a system of operatively connected brake levers arranged at one side of the truck between said side frames for operating the brake shoes at the same side of the truck, the outer lever at one end of the system being a live lever and the outer lever at the opposite end of the system being a dead lever, means carried by said truck frame and arranged on the outside of one of said side frames for operating said live lever and thereby said system, and means carried by said frame operative to vary the position of said dead lever to take up slack in the equipment, the last mentioned means being arranged on the outside of the last mentioned side frame.

9. In a brake equipment for a truck having spaced side frames and a plurality of pairs of wheels, the combination with brake shoes applied to both sides of each pair of wheels, of a system of operatively connected brake levers arranged at one side of the truck between said side frames for operating the brake shoes at the same side of the truck, the outer lever at one end of the system being a live lever and the outer lever at the opposite end of the system being a dead lever, means carried on the outer side of one of said truck frames for operating said live lever and thereby said system, and means also carried on the outer side of the last mentioned side frame and operated automatically for varying the position of said dead lever to take up slack in the equipment.

10. In a brake equipment for a truck having a truck frame and a plurality of pairs of wheels, the combination with brake shoes applied to both sides of each pair of wheels, of a system of operatively connected brake levers arranged at one side of the truck for operating the brake shoes at the same side of the truck, the outer lever at one end of the system being a live lever and the outer lever at the opposite end of the system being a dead lever, a brake cylinder device secured to one side of said truck frame intermediate the ends of the frame, means operatively connecting the brake cylinder device to said live lever, and a slack adjuster carried by said brake cylinder device and operatively connected to said dead lever for varying the position of said dead lever to take up slack in the equipment.

11. In a brake equipment for a truck having a truck frame and a plurality of pairs of wheels, the combination with brake shoes applied to both sides of each pair of wheels, of a system of operatively connected brake levers arranged at one side of the truck for operating the brake shoes at the same side of the truck, the outer lever at one end of the system being a live lever and the outer lever at the opposite end of the system being a dead lever, a brake cylinder device secured to one side of said truck frame intermediate the ends of the frame, means operatively connecting the brake cylinder device to said live lever, and an automatically operated slack adjuster carried by the brake cylinder device and controlled thereby for varying the position of the dead lever to take up slack in the equipment.

12. In a brake equipment, the combination with a truck frame, of a system of operatively connected brake levers carried by the truck frame, the outer brake lever at one end of the system being a live lever and the outer brake lever at the opposite end of the system being a dead lever, a brake cylinder device carried by the truck frame, a brake cylinder lever operatively connected to the brake cylinder device and said live lever, said brake cylinder lever having an opening therethrough, and slack adjusting means operative to vary the position of said dead lever to take up slack in the equipment, said slack adjusting means comprising a rod which extends through the opening in said brake cylinder lever.

13. In a brake equipment, the combination with a truck frame, of a system of operatively connected levers carried by the truck frame, mechanism carried by the truck frame operative to take up the slack in said system, and an operating lever for said system pivotally connected to the truck frame and having an opening therethrough for the reception of a portion of the slack take up mechanism.

14. In a truck brake equipment, the combination with a truck frame having spaced side members, of a system of operatively connected brake elements arranged between said side members carried by said frame, one of said elements being a dead lever constituting one end of said system and another of said elements being a live lever constituting the other end of said system, an automatic slack adjuster arranged on the outside of and carried by one side member of the truck frame and forming a fulcrum for said dead lever, and a brake cylinder arranged on the outside of and secured to said side member and operatively connected to said live lever, said brake cylinder being operative to control the operation of said slack adjuster.

15. In a truck brake equipment, the combination with a truck frame having side members, of a system of operatively connected brake levers carried by said truck frame, said system comprising a dead lever, and an adjustable fulcrum lever for said dead lever slidably fulcrumed on the truck frame.

16. In a truck brake equipment, the combination with a truck frame having side members, of a system of operatively connected brake levers carried by said truck frame, said system comprising a dead lever, and a fulcrum lever for said dead lever carried by the side frame and being angularly adjustable to take up slack in said system and being movable in the direction of its length relative to the truck frame as it is adjusted.

17. In a truck brake equipment, the combination with a truck frame having side members, of a system of operatively connected brake levers carried by said truck frame, said system comprising a dead lever, and a fulcrum lever for said dead lever, and means for varying the angularity of said lever to take up slack in said system, said fulcrum lever being slidably mounted on the truck frame to permit the fulcrum lever to move in the direction of its length relative to the truck frame as its angularity is varied.

In testimony whereof I have hereunto set my hand, this 26th day of June, 1931.

FRANCIS E. SCHWENTLER.